United States Patent Office 2,799,719
Patented July 16, 1957

2,799,719

WOOD FIBER SEPARATORS FOR STORAGE BATTERIES AND PROCESS FOR MAKING

John F. Schaefer and Anthony Sabatino, Milwaukee, Wis., assignors to Globe-Union Inc., Milwaukee, Wis., a corporation of Delaware No Drawing. Application December 19, 1952, Serial No. 327,038

2 Claims. (Cl. 136—146)

This invention relates to improvements in wood fiber separators for storage batteries and to the process for making them.

In the patent to John F. Schaefer No. 2,508,043, dated May 16, 1950, there is described and claimed a process of making battery separators from ground wood pulp. In such process the resinous materials in the pulp are dissolved and then precipitated onto the fibers of the pulp and the acid and acid forming constituents of the pulp are washed therefrom. Thereafter the pulp is sheeted and dried at atmospheric pressure at a temperature sufficiently controlled to cause the resinous precipitate to become uniformly distributed throughout the fibers of the sheet. This process produces a separator which is resistant to the electrolyte, has good tensile strength, dried or wet, ionic permeability, and produces desirable voltage characteristics when used in a battery. However, to produce such separators, this process has a curing range which is very narrow and therefore difficult to control in commercial installations. With this process some difficulty has been experienced in maintaining uniformity and appearance, and the separators will not rapidly fill with electrolyte.

It is an object of this invention therefore to provide a process for the making of wood fiber separators which can be easily controlled in commercial installations.

A further object is to provide a processed wood fiber separator which has the desirable qualities heretofore set forth and in addition has superior appearance and is quickly filled with electrolyte.

These objects are obtained principally by the addition of relatively coarse fibered woody materials to the ground wood in the pulp. This greatly broadens the control of the curing range. The use of a dispersing agent added to the pulp results in a more uniform sheet. The addition of resinous materials to the natural resins in the wood pulp improves the appearance of the resultant separators during useful life, the original shape being maintained during such life. Finally, the application to the separators of a wetting agent minimizes the time required for filling batteries with such separators assembled in the dry state.

The processed separator is made of natural fibers. According to said patent, wood of any species, natural fibrous growths other than wood, and used newsprint may be used. However, to obtain the most satisfactory results it is best to use as the basic material ground wood from spruce, fir, hemlock or poplar. There should be no addition of chemical pulp. While good separators may be made without any additions of woody material to such basic ground wood, it requires too close control of curing to produce the desired voltage characteristics. The curing range control is greatly enhanced by the addition to the ground wood of relatively coarse fibered woody materials or the like. For example, the curing may take place for a period of two minutes and forty seconds at a range of from 400° F. to 480° F. Using the pulp as described in said patent, the temperature selected determined the time, and vice versa, and once selection was made there could not be perceptible variation (as to that batch) without seriously affecting the electrical characteristics of the resultant separator. Timing may be closely controlled but not temperature; hence the latitude in temperature range for a given time of curing is a factor which greatly enhances commercial production and makes it feasible. However, once an ascertained temperature is reached within such range, it should be closely controlled.

One such additive is an essentially fine fibered excelsior known commercially as and hereinafter designated Balsam Wool. Additions of the Balsam Wool in the range of 5% to 10% based on the dry weight of all wood fiber material increases the wet strength of the resultant sheet, very much broadens the control of curing, and results in higher voltages on cold tests. However, with amounts over such 10%, it becomes difficult to form the sheet and its appearance deteriorates. This material is also available with an impregnation of asphaltic material and the latter may be used interchangeably with the former.

Another such additive is a product obtained by disk grinding steam expanded Douglas fir. This product is known commercially as and is hereinafter designated Silvacel. It has a fiber length similar to that of the Balsam Wool but the average diameter of the fiber appears to be smaller. Because of this, the Silvacel produces a sheet which has a more uniform appearance than that produced with Balsam Wool and the strength and voltage characteristics are maintained. The curing range becomes broader with the increase in the percentage of Silvacel used. However, with amounts over 40% based on the dry weight of all the wood fiber material, it becomes difficult to form the sheet. If amounts as great as 60% are used, the sheet is so porous that undesirable treeing might occur.

The resulting processed separator may be more uniform if there is added to the ground wood pulp and woody material additive a dispersing agent. One such agent is essentially the fibrous powder of the ligneous constituent of the bark of Douglas fir. It is high in caustic soluble lignin and is known commercially as Silvacon 412-G. It will be hereafter designated as Silvacon. It may be added in amounts not in excess of 10% by weight of all wood fiber material. Amounts above that tend to mechanically weaken the sheet. Another such agent is an alkali soluble pine lignin. It is comparable with the first agent. It is commercially known as Indulin A. It will be termed herein as Indulin.

It has been found that the appearance of the separator during any stage of its useful life may be improved so that its original appearance is maintained, if the natural resins present in the ground wood pulp are supplemented by a resinous material additive. This resinous material additive reduces the swelling of the sheet on immersion in the electrotylte. Among the resinous materials producing such beneficial result are rosin, asphalt emulsions, synthetic resin emulsions, and synthetic resin solutions. The addition of commercial rosin, abietic acid, or rosin soap in the range of from 1% to 10% by weight of the ground wood is satisfactory but the maximum beneficial effect is obtained with an approximate 5% addition. In the case of asphalt emulsion, the optimum result is obtained with an addition of about 2% by the dry weight of all wood fiber material. One such asphalt emulsion is commercially known as and hereinafter designated Bitusize B. The additions of synthetic resin emulsions and solutions do not produce separators noticeably superior to those containing the asphalt emulsions. If used, the thermo-plastic resins are preferable to the thermo-setting type.

During the sheeting of the separator it is desirable to apply a wetting agent in solution form. Since the separators are assembled dry, a substantial period of time will be required to fill the pores thereof with electrolyte. The wetting agent reduces this filling time to a minimum and produces a separator which is practically completely filled upon immersion. Wetting agents which are satisfactory include a dihexyl ester of sodium sulfosuccinic acid known commercially as "Aerosol MA." An alternative wetting agent is that commercially known as "Aerosol OTB." The wetting agent is preferably applied in a ½% solution in the quantity of 60 cc. per square foot of separator. The application is made on the vacuum drum during sheeting to obtain maximum penetration and minimum loss.

The following is an illustrative example of an embodiment of the present invention:

Woody material consisting of 65% of spruce groundwood, 24% of Silvacel, and 9% of Silvacon, all by dry weight, are placed in a cooking tank. An amount of flake caustic soda equal to 30% of the weight of the woody material is made into a 1½ water solution and put into such tank. At this time there is added one-half of the 2% by dry weight of Bitusize B. Such mixture is heated by steam injection, which also agitates, until the boiling point (212° F.) is reached. The mixture is cooked at such point for four hours. The batch is then transferred to a wooden tank and a 47% solution of sulphuric acid rapidly added (while the temperature of the slurry is from 200° F. to 210° F.) until the slurry is strongly acid (pH 2). The acid is added in less than five seconds per 100 pounds of batch. The consistency of the batch is then regulated by the addition of water to about ¾% concentration of solids.

The undesirable soluble materials are removed by dewatering the slurry on a drum filter. This material includes primarily acid forming organic materials and sodium acid sulphate. Depending upon the type of filter, more than one pass may be needed. In such case, a resuspension and re-filter is accomplished. The pH is now approximately 4.3.

After such final washing, the resultant cake is again suspended in water and diluted to a consistency of from ⅓% to ¼% and the acidity of the resultant slurry adjusted to a pH of 5.4. The remaining one-half of the Bitusize B is now added and the slurry sheeted on a vacuum drum filter. While the sheet is still on the drum, Aerosol MA is sprayed onto such sheet in a ½% solution in the quantity of 60 cc. per square foot of sheeting. This causes such wetting agent to be evenly distributed throughout the sheet by the suction action of the drum.

The sheet as it leaves the sheeting drum rides on a flat belt and while on such belt passes between steel rolls. The top roll is grooved and is forced toward the bottom roll with a pressure of between 300 to 1,000 pounds per lineal foot. As a consequence, projecting ribs are formed in the sheet.

From the ribbing rolls the sheet is carried into a drying oven having a temperature of approximately 450° F. This temperature is lowered as the sheet passes through, so that in passing the temperature of the sheet is between 212° F. and 240° F. At the exit end of the drying oven the sheet is bone dry and at a temperature of approximately 215° F. It is desirable to remove all moisture before curing the sheet.

The sheet passes through a forced draft hot air continuous oven. The speed of the sheet is regulated so that it takes approximately two minutes and forty seconds for one point of the sheet to pass through the oven. The oven is regulated to maintain the sheet at a temperature of from 400° F. to 480° F. Within such range the resinous precipitate and the fibers become interrelated in a manner to give the sheet desired tensile strength, porosity, acid resistance, and electrical resistance (S. A. E. specified five second voltages). It is the buffering action of the added coarse fibered woody materials which compensates for the differences in freeness in the basic ground wood in the pulp and so affects the process as to make it capable of being used in large scale production.

It is to be understood that the above detailed description of the present invention is intended to disclose an embodiment thereof to those skilled in the art, but that the invention is not to be construed as limited in its application to the details set forth, since the invention is capable of being practiced and carried out in various ways without departing from the spirit of the invention. The language used in the specification relating to the function of the invention is employed for purposes of description and not of limitation, and it is not intended to limit the scope of the following claims beyond the requirements of the prior art.

We claim:

1. A processed wood fibre separator sheet for storage batteries formed from the following ingredients in the dry weight proportions designated:

65% spruce ground wood;
24% disk ground steam expanded Douglas fir;
9% of a dispersing agent consisting of a fibrous powder of the ligneous constituent of the bark of Douglas fir high in caustic soluble lignin; and
2% of asphalt emulsion.

2. A processed wood fibre separator sheet for storage batteries formed from the following ingredients in the dry weight proportions designated:

Up to 40% disk ground steam expanded Douglas fir;
2% of asphalt emulsion; and
The remainder ground wood from spruce.

References Cited in the file of this patent

UNITED STATES PATENTS

| | | |
|---|---|---|
| 2,090,758 | Hoflin | Aug. 24, 1937 |
| 2,314,203 | Fairclough | Mar. 16, 1943 |
| 2,508,043 | Schaefer | May 16, 1950 |